Figure 1:
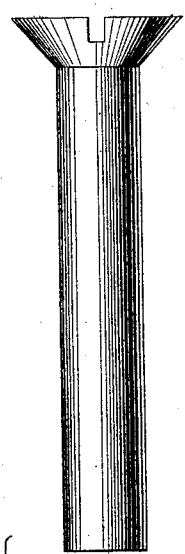

(No Model.)

H. NETTLEFOLD & J. SHELDON.
MANUFACTURE OF SCREWS.

No. 452,548. Patented May 19, 1891.

Witnesses:-
George Shaw
Richard Skerrett

Inventors:-
Hugh Nettlefold
John Sheldon.

UNITED STATES PATENT OFFICE.

HUGH NETTLEFOLD AND JOHN SHELDON, OF BIRMINGHAM, ENGLAND, ASSIGNORS TO THE NETTLEFOLDS, LIMITED, OF SAME PLACE.

MANUFACTURE OF SCREWS.

SPECIFICATION forming part of Letters Patent No. 452,548, dated May 19, 1891.

Application filed August 12, 1890. Serial No. 361,836. (No model.)

*To all whom it may concern:*

Be it known that we, HUGH NETTLEFOLD and JOHN SHELDON, both of Birmingham, England, subjects of the Queen of Great Britain, have invented a certain new and useful Improvement or Improvements in the Manufacture of Screws; and we do hereby declare that the following is a full, clear, and exact description of the invention, which will enable others skilled in the art to which it appertains to make and use the same.

This invention relates to screws which are produced by first reducing the shank which is to be threaded and subsequently forming the thread thereupon, so that its diameter does not exceed the diameter of the unthreaded body of the screw.

The object of our invention is to improve the prior method or process of manufacturing this type of screws by avoiding that character of pressure at opposite sides of the shank which results in shortening the radii at such points and lengthening the radii at right angles to the shortened radii.

In the ordinary manufacture of screws, in which the screw-thread is formed by the pressure of a tool or a roll, no metal is cut away, and consequently the screw-thread formed is of greater diameter than the unthreaded body of the screw, because the metal is displaced to form the trough of the screw-thread, thereby forcing the displaced metal outwardly or radially, so that the crest or summit of the thread is of greater diameter than the unthreaded body portion of the screw. This ordinary method produced inferior screws, and to avoid this objection it has been proposed to reduce the diameter of the shank which is to be threaded by rolling down such portion of the shank until its diameter is so far reduced that in the subsequent formation of the threads they will be thrown out from the surface to such a distance that the diameter of the screw-thread will not exceed the diameter of the unthreaded body of the screw.

We have practically demonstrated by costly experiments that the reduction of the screw-blank by rolling will not produce good results, in that before the reduction can be effected pressure must be placed on the blank at opposite sides thereof, which pressure results in the shortening of the radii at these points, and consequently lengthens the radii at opposite points on a line at right angles to the shortened radii. This does not reduce the area, but simply changes the cylindrical section of the blank to an oval section of the same equal area. Therefore it will be obvious that when rotation is given to the blank by the screw-forming dies a constant change of position in the minor and major axes is constantly taking place, which soon results in the total destruction of the homogeneity of the blank and splitting the blank radially and longitudinally. The result stated arises from the fact that rolling as heretofore proposed does not lengthen the blank, and therefore the area of the blank is not reduced, but the cylindrical section of the blank is simply changed to an oval section of the same equal area, as above explained.

In manufacturing a screw according to our invention we take a blank having a shank of uniform thickness and of a length sufficient to provide for the formation of the screw-thread after the shank has been reduced and elongated. To reduce the diameter of that part on which the screw-thread is to be made we subject the shank to a drawing process, so that such shank is reduced and elongated, but remains a true cylinder. The drawing process can be accomplished by mechanism suitable for the conditions required, and since such mechanisms are well known to those skilled in the art we do not deem it essential to illustrate the same in the drawings. In the reduction of the blank by drawing, as stated, the metal must not be planished or hardened, as such would necessitate the reannealing and pickling of the blanks before a thread could be rolled thereupon. By reducing the shank of the screw-blank to be threaded by the process of drawing, which is effected at several operations, the metal is displaced in the direction of the length of the shank, and consequently the metal is compressed but slightly in the direction of the axis of the shank, thereby leaving the metal soft and ductile and practically the same as before the operations were performed, so that the process of forming the screw-thread can be readily effected without waste.

The blank prepared as described is subjected to the action of any suitable pressing or rolling devices which will only operate on that part of the blank which has been drawn to a reduced diameter, and produce the screw-thread so that its diameter will not exceed the diameter of the unthreaded body of the screw.

Figure 2:
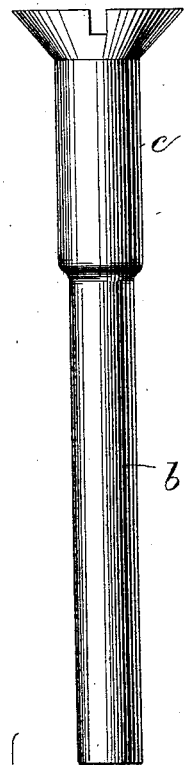
Figure 3:
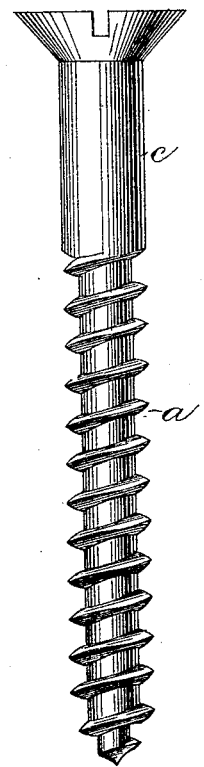

In the accompanying drawings, Figure 1 represents an elevation and cross-section of the screw-blank prior to its being reduced by the drawing process. Fig. 2 represents an elevation and cross-section of the blank after it has been drawn to reduce its diameter, and Fig. 3 represents an elevation of the screw made according to our method or process.

We are aware that it has been proposed to manufacture screws by rolling the shank which is to be threaded and subsequently rolling up threads upon such reduced part of the shank by suitable dies. The objection to such has been before explained, and inasmuch as such prior method does not constitute our method it is hereby disclaimed.

What we claim is—

The method or process hereinbefore described of manufacturing screws, which consists in reducing and elongating the shank which is to be threaded by subjecting it to a drawing action and subsequently forming the screw-thread by pressure, so that the diameter of such thread does not exceed the diameter of the screw-body, substantially as set forth.

HUGH NETTLEFOLD. [L. S.]
JOHN SHELDON. [L. S.]

Witnesses:
GEORGE SHAW,
RICHARD SKERRETT.